United States Patent [19]

Thompson et al.

[11] 3,919,388

[45] Nov. 11, 1975

[54] PROCESS FOR PRODUCTION OF PIGMENTARY TITANIUM DIOXIDE

[75] Inventors: Peter Charles Thompson, Northallerton; Thomas Aisbitt Bowbeer, Guisborough, both of England

[73] Assignee: British Titan Limited, England

[22] Filed: Apr. 9, 1973

[21] Appl. No.: 349,453

[30] Foreign Application Priority Data

Aug. 18, 1972 United Kingdom............... 38536/72
Jan. 18, 1973 United Kingdom................ 2614/73

[52] U.S. Cl. .................. 423/69; 423/76; 423/489; 423/612; 423/615
[51] Int. Cl.² .................. C01G 23/06; C01G 23/08
[58] Field of Search ........ 423/612, 615, 69, 76, 489

[56] References Cited

UNITED STATES PATENTS

| | | | |
|---|---|---|---|
| 2,285,485 | 6/1942 | Burksdale et al. .................. | 423/612 |
| 2,519,389 | 8/1950 | Mayer ................................ | 423/612 |
| 2,900,234 | 8/1959 | Jackson et al. ..................... | 423/76 X |
| 3,501,271 | 3/1970 | Twist et al. ....................... | 423/615 X |
| 3,706,829 | 12/1972 | Solomka et al. ................... | 423/615 |

FOREIGN PATENTS OR APPLICATIONS

2,060,861   6/1971   Germany .............................. 423/69

OTHER PUBLICATIONS

J. W. Mellor's "A Comprehensive Treatise on Inorganic and Theoretical Chemistry," Vol. 7, 1927, p. 67, Longmans, Green & Co., New York.

"Treatise on Inorganic Chemistry" by H. Remy, Vol. 2, 1956, p. 58, Elsevier Pub. Co., New York.

J. W. Mellor's "A Comprehensive Treatise on Inorganic and Theoretical Chemistry," Vol. 13, 1934, Ed., p. 809, Longman, Green & Co., New York.

*Primary Examiner*—Edward Stern
*Attorney, Agent, or Firm*—Schuyler, Birch, Swindler, McKie & Beckett

[57] ABSTRACT

Process for the production of pigmentary titanium dioxide by converting an iron-containing titaniferous material such as ilmenite to titanium tetrafluoride and thereafter reacting the titanium tetrafluoride with sulphuric acid to form titanium sulphate, converting titanium sulphate to an aqueous acidic solution thereof and subjecting the solution to thermal hydrolysis to precipitate hydrous titanium dioxide which is then calcined.

22 Claims, No Drawings

PROCESS FOR PRODUCTION OF PIGMENTARY TITANIUM DIOXIDE

The present invention is a process for the production of pigmentary titanium dioxide.

The most commonly used process for the production of pigmentary titanium dioxide is by the so-called "sulphate" process wherein an iron-containing titaniferous starting material such as ilmenite is attacked directly with concentrated sulphuric acid to form a solid cake consisting principally of titanium and iron sulphates. This cake is dissolved in water or dilute sulphuric acid to form an aqueous acidic solution of iron and titanium sulphates. The solution is then normally reduced, for example with scrap iron, and may be concentrated before being subjected to thermal hydrolysis to precipitate hydrous titanium dioxide. The mother liquor, containing iron sulphate and sulphuric acid, constitutes a waste product and its disposal presents considerable difficulties where pollution of the environment is to be avoided. The hydrous titanium dioxide is normally additioned with minor proportions of other compounds before calcining to form the desired pigmentary titanium dioxide. After calcination, the material is subjected to various treatments such as milling, classification, coating and/or final milling, for example in a fluid energy mill.

It is an object of the present invention to provide an improved process of this type, particularly with regard to the effluent problems associated therewith and/or with regard to the quality of the pigmentary titanium dioxide produced.

Accordingly, the present invention is a process for the production of pigmentary titanium dioxide comprising converting an iron-containing titaniferous material to titanium tetrafluoride, reacting titanium tetrafluoride with sulphuric acid to form titanium sulphate, forming an aqueous acidic solution of titanium sulphate, subjecting the titanium sulphate solution to thermal hydrolysis to precipitate hydrous titanium dioxide and thereafter calcining the hydrous titanium dioxide.

The iron-containing titaniferous material used as a starting material in the process of the present invention is preferably ilmenite although other materials such as slags formed by the electro smelting of ilmenite or leucoxene may also be suitable. Such materials are normally in a finely divided form and, if not sufficiently so, may be milled, for example by ball milling, before being used in the present process.

The preferred method of converting the iron-containing titaniferous material to titanium tetrafluoride is by the reaction of the titaniferous material with ferric fluoride as described and claimed, for example in U.S. application Ser. No. 349,454, filed Apr. 9, 1973. In this process ferric fluoride is heated with an iron-containing titaniferous material such as ilmenite, which may or may not have been preoxidised but which has preferably been preoxidised until all the iron is in the ferric state, at a temperature in the range 500° to 1,500°C in dry air to form titanium tetrafluoride as a vapour which is then condensed and recovered and ferric oxide (which may be converted to ferric fluoride by reacting with hydrogen fluoride obtained as a by-product from a later stage of the process as described in this specification). However, titanium tetrafluoride may also be made by other processes, for example by the fluorination of mineral rutile in a fluidised bed.

The titanium tetrafluoride, since it is recovered as a vapour, is relatively free from impurities, particularly those which will cause discolouration of the pigmentary $TiO_2$ ultimately produced, and thus the pigmentary $TiO_2$ is normally of excellent brightness and purity.

The titanium tetrafluoride is reacted with sulphuric acid in such a manner as to form a solid hydrated titanium sulphate and aqueous hydrofluoric acid. Suitably, the sulphuric acid is aqueous sulphuric acid having a concentration of between 20 and 95% $H_2SO_4$ and preferably one in the range 60 to 90% $H_2SO_4$. The ratio of titanium, expressed as $TiO_2$, to sulphuric acid is suitably in the range 1:1 to 1:3 and preferably in the range 1:1.6 to 1:2.0. If higher ratios of acid to titanium are used less acid may be required when dissolving the resulting titanium sulphate hydrate (to ensure the most desirable titanium/sulphuric acid ratio in the resulting solution for thermal hydrolysis to hydrous titanium dioxide pulp).

The reaction temperature may be in the range 70° to 300°C and is preferably in the range 150° to 250°C depending, at least to some extent, on the strength of sulphuric acid initially used.

The cake may be dissolved in water or dilute sulphuric acid and it is preferred that sufficient water or acid be used to give, together with the acid retained in the solid titanium sulphate, an aqueous acidic titanium solution having a titanium content (expressed as $TiO_2$) in the range 150 to 350 gram/litre and particularly one in the range 200 to 300 gram/litre and a sulphuric acid concentration in the range 300 to 600 gram/litre and particularly one in the range 350 to 550 gram/litre.

It is of advantage to filter the liquor before commencing the hydrolysis since this ensures that undissolved solids are removed and consequent contamination of the hydrous $TiO_2$ pulp avoided.

It has been found desirable, before thermally hydrolysing the titanium sulphate solution, to remove as much as possible of the fluoride in the titanium sulphate since the presence of an excessive quantity of fluoride may adversely affect the yield of hydrous titanium dioxide and a second or even a third hydrolysis may be required to obtain a high yield of of hydrous titanium dioxide after the hydrous titanium dioxide from the previous hydrolysis has been separated and recovered.

When removing the fluoride it is preferred that the titanium sulphate solution has an acid to titanium ratio in the range 1 to 3 and preferably one in the range 1.6 to 2. (The acid referred to here is that acid which can be titrated with a base such as sodium hydroxide to an end point using methylorange as an indicator.) Such solutions are normally rather viscous. The solution is preferably heated, for example to a temperature in the range 110° to 140°C to remove some fluoride as gaseous hydrogen fluoride. During this heating the solution may foam and the viscosity may increase, possibly after an initial decrease, and particularly as the foaming subsides. At this stage direct heating, if applied, should be reduced or stopped to prevent or minimise the formation of anhydrous titanium sulphate and steam passed through the liquid. It is preferred that the temperature of the steam should be in the range 150° to 220°C and preferably about 180°C.

As the passage of steam continues the viscosity of the liquid may increase and solidification may take place. It is preferred that the product consists of a white or white-brown crystalline material. The formation of a solid black "glass" by premature cooling of the product should be avoided since this often retains a substantial quantity, for example up to 8%, of fluoride ions which are difficult to remove.

It is desirable that the passage of the steam and the subsequent cooling of the product be conducted so that the resulting material contains as little fluoride as possible and certainly not more than 1.5% by weight (expressed as the fluoride ion). Concentrations below 1% by weight are preferred and it appears that concentrations below 0.5% and even below 0.1%, by weight, can be achieved by the aforementioned process.

When subjecting the aqueous acidic titanium sulphate solution to thermal hydrolysis, the solution is heated to a temperature in the range 80° to 150°C, and preferably to its boiling point at atmospheric pressure, until substantially all the titanium has been precipitated as hydrous titanium dioxide pulp. If desired, additions of water and/or dilute acid may be made during the hydrolysis and/or the temperature may be varied during precipitation to improve the product of the precipitation. Normally the conditions of precipitation will be such that precipitation takes place over a period of from 1 to 6 hours and preferably over a period of from 2 to 5 hours. These times are, however, for conventional hydrolyses at atmospheric pressure. Hydrolyses at higher temperatures or which entail a delay, for example by cessation of stirring and/or agitation for a period, during hydrolysis may require shorter or longer periods to complete the hydrolysis.

Anatase- or rutile-inducing nuclei, normally prepared externally from aqueous titanium tetrachloride solution by the adjustment of the pH by the addition of acid or alkali, may, of course, be added to the aqueous acidic titanium sulphate solution before or during hydrolysis, as is well known in such hydrolyses in the "sulphate" process. Quantities of nuclei (expressed as $TiO_2$) in the range 0.1 to 10% and particularly in the range 0.2 to 5% based on the amount of titanium (expressed as $TiO_2$) are normally added.

After the hydrous titanium dioxide has been precipitated, it is recovered, normally be filtration or by the use of a centrifuge, and is well washed to remove soluble salts and other impurities. If desired, the washing may be preceded by resuspending the pulp in water in the presence of a reducing agent such as zinc or trivalent titanium (as is well known in the sulphate process) since this assists in the removal of impurities during washing. Quantities of reducing agent used are normally in the range 0.05 to 0.5% by weight on the titanium (expressed as $TiO_2$).

After washing and before calcination the hydrous pulp may be additioned with compounds, and in the quantities, which confer improvements on the pigment after calcination, for example phosphates, alkali metals, sulphates, alumina, zinc and/or other compounds which are commonly added for such purposes to the pulp obtained from the "sulphate" process.

The additioned material is then calcined, for example by heating to temperatures in the range 700° to 1,000°C for periods of time in the range 12 hours to 24 hours, i.e., under conditions which are well known for pulps obtained from the sulphate process.

After calcination the titanium dioxide may be subjected to known treatments to improve its subsequent pigmentary properties, for example to dry or wet milling, classification, coating with metal or metalloid oxides and/or with organic compounds and, finally, to milling once more, normally in a fluid energy mill. Alternatively, after wet coating the material may be subjected to spray drying and/or to pelletising after drying. dying.

Hydrogen fluoride is generated during the reaction between titanium tetrafluoride and sulphuric acid (in the formation of titanium sulphate) and may be recovered, cooled and absorbed to form aqueous hydrofluoric acid or may be recovered as anhydrous vapour. The anhydrous and/or aqueous hydrogen fluoride may conveniently be recycled to react with ferric oxide (formed from the reaction between ilmenite and ferric fluoride) to produce more ferric fluoride with which to react with more ilmenite, thus providing a cyclic process. Ferric fluoride produced by the reaction of ferric oxide and weaker aqueous hydrofluoric, e.g., about 40% or below may be in the form of the hydrate, believed to be $FeF_3.3H_2O$, and this may be heated with stronger aqueous hydrogen fluoride or with anhydrous hydrogen fluoride to form anhydrous ferric fluoride and aqueous hydrofluoric acid which may be recycled; the former to react with more ilmenite or other iron-containing titaniferous material and the latter to react with ferric oxide to form more ferric fluoride either as the hydrate for subsequent dehydration or as the anhydrous product for reaction with more iron-containing titaniferous material.

Sulphuric acid in the mother liquor from the hydrolysis of titanium sulphate liquors is purer than such acid formed in the normal sulphate process (since it contains substantially no iron and other impurities from the iron-containing titaniferous starting material) and it may, therefore, be concentrated more readily for reuse. Sulphuric acid is normally required in two strengths in the present process, i.e., as more dilute acid to dissolve the solid titanium sulphate hydrate after reaction between titanium tetrafluoride and sulphuric acid and as more concentrated acid to react with the titanium tetrafluoride to produce the solid titanium sulphate hydrate. Acid of these concentrations may be produced either by partly concentrating some of the acid to one strength and concentrating the remaining acid to the higher strength or, conversely, all the acid can be concentrated to the higher strength and a portion diluted to produce the weaker acid.

Impurities which are present in the acid may be removed, for example by contact with suitable ion exchange material or by solvent extraction, as desired, before concentration. Such purification steps prevent build-up of impurities during recycle.

If desired, the hydrous titanium dioxide pulp, before calcination, can be washed and neutralised, for example with ammonia, and the ammonium sulphate thus produced may be decomposed to provide gaseous ammonia and sulphuric acid. Both these compounds can be recycled to earlier stages of the process.

Because of the purification obtained by the formation of titanium tetrafluoride as a vapour and its subsequent recovery in the absence of iron and other impurities the purity of the titanium dioxide (and other compounds formed during the process and recycled) is much greater than from the sulphate process. Furthermore, since substantially all products of the process other than $TiO_2$ can be recycled the problems of effluent disposal are much reduced or eliminated.

The following Examples show methods of carrying out the present invention:

EXAMPLE 1

Titanium tetrafluoride (200 parts) was prepared by heating ferric fluoride and ilmenite in dry air to a temperature of 850°C for 1 hour and condensing the gaseous product. This material was heated to 200°C in an acid-resistant vessel with 177 parts of 98% sulphuric acid (a 10% stoichiometric excess) and 29 parts of water. Anhydrous HF was evolved and was condensed and collected. The heating was continued until the recovery of HF was 99.5% that of the theoretical quantity.

The solid cake formed in the reaction vessel was broken up and dissolved in dilute sulphuric acid to form a solution containing 260 grams/litre of titanium (expressed as $TiO_2$) and 460 grams/litre of sulphuric acid.

The solution was seeded with 2% by weight (expressed as $TiO_2$ on $TiO_2$) of rutile-inducing nuclei prepared by adding sodium hydroxide to aqueous $TiCl_4$ to form a milky-white liquid, and the mixture was boiled for 3 hours to precipitate hydrous titanium dioxide pulp.

The hydrous titanium dioxide pulp was filtered off and the mother liquor was re-seeded and boiled to precipitate moe hydrous titanium dioxide. This pulp was filtered off, combined with that produced by the first hydrolysis, washed, filtered and calcined at 900°C to form pigmentary titanium dioxide, 98.5% of which was in the rutile form, and which was of excellent brightness and of very uniform crystal size. The overall yield of $TiO_2$ (based on $TiF_4$) was 80%.

The HF recovered from the initial reaction between $TiF_4$ and $H_2SO_4$ was divided into two parts, one of which was diluted with water to give aqueous 40% HF. This was mixed with ferric oxide (obtained from the reaction between ferric fluoride and ilmenite) and heated to produce hydrated ferric fluoride in high yield. This hydrated ferric fluoride was heated with the remaining anhydrous HF to form anhydrous ferric fluoride and aqueous HF, which was distilled off, condensed and recovered.

EXAMPLE 2

Solid titanium tetrafluoride (prepared by reacting ferric fluoride with preoxidised ilmenite at about 850°C) was dissolved in 87% sulphuric acid to form a viscous solution having an acid/titanium ratio of 1.8:1. This solution was heated progressively to 140°C during which time the viscosity decreased and vigorous foaming took place as HF was evolved. As the foaming subsided the viscosity began to increase and the heating was stopped.

Steam at 180°C was then passed through the liquid until the liquid solidified to a fawn/white crystalline solid which, on analysis, was found to contain 0.5% fluoride (expressed as fluoride ions).

The crystalline material was dissolved in water to give an aqueous liquid containing a titanium concentration (expressed as $TiO_2$) of 260 g./litre and a total sulphuric acid concentration of 468 g./litre. This solution, on thermal hydrolysis by boiling for 3.5 hours in the presence of externally prepared nuclei prepared as described in Example 1, formed solid hydrous $TiO_2$ in a yield of 99%. The material was of excellent whiteness and on calcination as described in Example 1 gave titanium dioxide containing 98.5% rutile. The quality of the product was at least equal to that produced according to Example 1.

What is claimed is:

1. A process for the production of pigmentary titanium dioxide comprising:
    converting an iron-containing titaniferous material to titanium tetrafluoride,
    reacting the titanium tetrafluoride with sulphuric acid to form titanium sulphate solution and hydrogen fluoride,
    removing hydrogen fluoride prior to hydrolysis of the titanium sulphate,
    forming an aqueous acidic solution of titanium sulphate,
    subjecting the aqueous acidic titanium sulphate solution to thermal hydrolysis to precipitate hydrous titanium dioxide, and
    thereafter calcining the hydrous titanium dioxide.

2. A process as claimed in claim 1 wherein the titanium tetrafluoride is formed by the reaction of ferric fluoride with ilmenite.

3. A process as claimed in claim 1 wherein the titanium tetrafluoride is reacted with aqueous sulphuric acid having a concentration in the range 20 to 95%.

4. A process as claimed in claim 3 wherein the aqueous sulphuric acid has a concentration in the range 60 to 90%.

5. A process as claimed in claim 1 wherein the ratio of titanium (expressed as $TiO_2$) to sulphuric acid is in the range 1:1 to 1:3.

6. A process as claimed in claim 5 wherein the ratio of titanium to sulphuric acid is in the range 1:1.6 to 1:2.0.

7. A process as claimed in claim 1 wherein titanium tetrafluoride and sulphuric acid are reacted together at a temperature in the range 70° to 300°C.

8. A process as claimed in claim 7 wherein titanium tetrafluoride and sulphuric acid are reacted together at a temperature in the range 150° to 250°C.

9. A process as claimed in claim 1 wherein said aqueous acidic titanium sulphate solution contains titanium (expressed as $TiO_2$) in a concentration in the range 150 to 350 gram/litre and sulphuric acid in the range 300 to 600 gram/litre.

10. A process as claimed in claim 9 wherein said aqueous acidic titanium sulphate solution contains titanium (expressed as $TiO_2$) in the range 200 to 300 gram/litre and sulphuric acid in the range 350 to 550 gram/litre.

11. A process as claimed in claim 1 wherein said titanium sulphate solution is heated and fluoride is removed from said titanium sulphate by passing steam through the heated solution.

12. A process as claimed in claim 11 wherein the acid to titanium ratio of the solution is in the range 1 to 3.

13. A process as claimed in claim 12 wherein the ratio is in the range 1.6 to 2.

14. A process as claimed in claim 11 wherein the solution is heated to a temperature in the range 110° to 140°C.

15. A process as claimed in claim 11 wherein the steam is at a temperature in the range 150° to 220°C.

16. A process as claimed in claim 11 wherein the titanium sulphate after fluoride removal contains less than 1% by weight of fluoride ions.

17. A process as claimed in claim 1 wherein the aqueous acidic solution of titanium sulphate is hydrolysed by heating to a temperature in the range 80° to 150°C. for a period of from 2 to 5 hours.

18. A process as claimed in claim 1 wherein the aqueous acidic solution of titanium sulphate is hydrolysed in the presence of from 0.2 to 5% of nuclei (expressed as $TiO_2$) based on the amount of titanium (expressed as $TiO_2$).

19. A process as claimed in claim 1 wherein the hydrogen fluoride liberated during the reaction between titanium tetrafluoride and sulphuric acid is reacted with ferric oxide to form ferric fluoride.

20. A process as claimed in claim 1 wherein the sulphuric acid in the mother liquor from the hydrolysis of the aqueous acidic titanium sulphate solution is purified by solvent extraction.

21. A process for the production of pigmentary titanium dioxide comprising:
  a. converting an iron-containing titaniferous material to titanium tetrafluoride;
  b. reacting the titanium tetrafluoride with aqueous sulphuric acid having a concentration of between 20 and 95% $H_2SO_4$ to form a solid hydrated titanium sulphate and aqueous hydrofluoric acid;
  c. heating the mixture to a temperature in the range 110° to 140°C. to remove fluoride as gaseous hydrogen fluoride;
  d. dissolving said solid hydrated titanium sulphate in a solvent selected from the group consisting of water and dilute sulphuric acid to form an aqueous acidic titanium sulphate solution having a titanium content (expressed as $TiO_2$) in the range 150 to 350 gram/litre;
  e. seeding the aqueous acidic titanium sulphate solution with anatase or rutile inducing nuclei;
  f. subjecting the seeded aqueous acidic titanium sulphate solution to thermal hydrolysis by heating said solution to a temperature in the range 80° to 150°C. until substantially all the titanium has been precipitated as hydrous titanium dioxide; and
  g. calcining said hydrous titanium dioxide.

22. A process as claimed in claim 1 wherein the sulphuric acid in the mother liquor from the hydrolysis of the aqueous acidic titanium sulphate solution is purified by contact with an ion-exchange resin.

* * * * *